United States Patent [19]
Yeakey

[11] 3,832,402
[45] Aug. 27, 1974

[54] TERTIARY POLYOXYALKYLENEPOLYAMINES

[75] Inventor: Ernest Leon Yeakey, Austin, Tex.

[73] Assignee: Jefferson Chemical Company, Inc., Houston, Tex.

[22] Filed: Mar. 1, 1972

[21] Appl. No.: 230,990

Related U.S. Application Data

[60] Division of Ser. No. 96,247, Dec. 8, 1970, Pat. No. 3,660,319, which is a continuation-in-part of Ser. No. 803,934, March 3, 1969, abandoned.

[52] U.S. Cl............................................ 260/584 B
[51] Int. Cl............................................ C07c 93/04
[58] Field of Search ............................. 260/584 B

[56] References Cited
UNITED STATES PATENTS 2,683,147  10/1972  Yeakey ............................ 260/584 B
3,654,370  7/1954  Girod ............................... 260/584 B Primary Examiner—Lewis Gotts
Assistant Examiner—D. R. Phillips
Attorney, Agent, or Firm—James L. Bailey; John R. Kirk, Jr.

[57] ABSTRACT

New tertiary amines prepared from polyoxyalkylenepolyamines are useful catalysts for preparing urethane foams. The new tertiary amines are prepared by alkylation of the polyoxyalkylenepolyamine with an aldehyde and hydrogenation of the product.

8 Claims, No Drawings

TERTIARY POLYOXYALKYLENEPOLYAMINES

CROSS REFERENCE TO RELATED APPLICATION

This application is a division of my copending application Ser. No. 96,247, filed Dec. 8, 1970, now U.S. Pat. No. 3,660,319, entitled "Tertiary Polyoxyalkylenepolyamines," which is a continuation-in-part of my application Ser. No. 803,934, filed Mar. 3, 1969 and entitled "Tertiary Polyoxyalkylenepolyamines," now abandoned.

BACKGROUND OF THE INVENTION

1. Field of the Invention

The invention pertains to the field of organic chemistry of new tertiary amines.

2. Description of the Prior Art

F. G. Willeboordse, F. E. Critchfield, and R. L. Meeker teach the use of amine ethers and amine thioethers as catalysts in the manufacture of urethane foams in the publication entitled "Kinetics and Catalysis of Urethane Foam Reactions" in the *Journal of Cellular Plastics*, January, 1965.

SUMMARY OF THE INVENTION

Tertiary amines having the formula $$R\left[\left(OCH_2CH\atop |\atop X\right)_n -OCH-CH-NA_2\atop |\quad\ |\atop Y\quad Z\right]_m$$

where Z is an alkyl group containing 1 to 18 carbon atoms, X and Y are hydrogen or Z, $n$ has an average value of 0 to 50, $m$ is an integer from 2 to 12, R is the nucleus of an oxyalkylation-susceptible aliphatic polyhydric alcohol containing 2 to 12 carbon atoms with functionality from 2 to 12 and A is an alkyl group containing 1 to 4 carbon atoms.

DESCRIPTION OF THE PREFERRED EMBODIMENTS

EXAMPLE I 3,3'-(Methylethylenedioxy)bis(N,N-dimethylisopropylamine) was prepared according to the following equation:

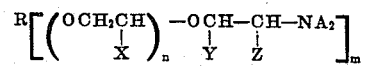

3,3'-(Methylethylenedioxy)bis(isopropylamine)

(A tripropyleneglycoldiamine)

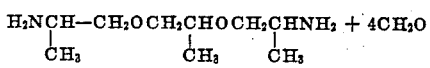

3,3'-(methylethylenedioxy)bis(N,N-dimethylisopropylamine). The tripropyleneglycoldiamine was added slowly to a slurry of 90 percent formaldehyde (140 g.) and methanol (330 g.). A slight exothermic reaction was observed. The mixture was then refluxed for two hours to obtain a clear solution. This solution was placed in a 1-liter stirred autoclave with 50 g. of a nickel-copper-chromium hydrogenation catalyst. The autoclave was flushed with hydrogen, pressured to 500 psig. with hydrogen, heated to 100°–110°C., and repressured to 3,000 psig. with hydrogen. The clave was periodically repressured to 3,000 psig. until hydrogen absorption ceased. The catalyst was removed by filtration and the filtrate was distilled. A yield of 154 g. of the amine product was collected at 141°–149°C. (20 mm.). Analysis showed $n_D^{25}$ 1.4366, specific gravity 20/20 0.8887.

EXAMPLE II

A tertiary amine was prepared by adding slowly 1,900 grams of tetrapropyleneglycoldiamine to a slurry of 90 percent paraformaldehyde (1050 g.) and methanol (2950 g.). An exothermic reaction was observed. The mixture was refluxed for 2 hours until a clear solution was obtained. This reaction was then run three additional times in an identical manner. The combined products were then pumped through a small continuous reactor composed of a stainless steel tube 27 inches long having an inside diameter of 1.25 inches and packed with pelleted nickel-copper-chromium hydrogenation catalyst. The reactor was maintained at 110°–120°C. and 2,700–3,000 psig. Hydrogen (235 liter/hr.) was added to the reactor along with the methanolic amine solution (1.0 lb./hr.). During the extended run 13.89 kg. of solution was pumped through the reactor and 12.16 kg. of effluent was recovered. Reactor effluent was stripped of methanol at atmospheric pressure and of lights at 100°–127°C. at 8 mm. pressure. The remaining material was passed through a small laboratory wiped-film evaporator at 200°C. and 5 mm. pressure to give 4.62 kg. of colorless liquid having 6.56 meq./g. total amine, 0.01 meq./g. primary amine, and 0.09 meq./g. secondary amine. The probable formula of this amine is

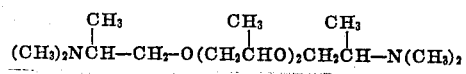

EXAMPLE III

A tertiary amine was prepared by adding slowly 400 grams of polyoxypropylenediamine having a molecular weight of 400 to a slurry of 90 percent paraformaldehyde (116.5 g.) and methanol (515 g.). A slight exothermic reaction occurred which was completed by heating the mixture to 65°C. for 2 hours. The homogenous methanolic solution was placed in a 1-gallon stirred autoclave with 100 g. of a nickel-copper-chromium hydrogenation catalyst. The autoclave was flushed with hydrogen, pressured to 500 psig. with hydrogen, heated to 100°–110°C., and repressured to 3,000 psig. with hydrogen. The autoclave was then periodically repressured with hydrogen as needed to maintain a total pressure of 2,000–3,000 psig. for 1.5 hours. The catalyst was removed by filtration and the filtrate was stripped at 150°C. and 50 mm. pressure to yield 395 g. of a pale yellow oil which had the following properties:

| | |
|---|---|
| Total amine | 3.79 meq./g. |
| Primary amine | Nil |
| Secondary amine | 0.28 meq./g. |
| Tertiary amine | 3.51 meq./g. |

The probable formula for the tertiary amine is

EXAMPLE IV

An excellent rigid urethane foam was prepared using the 3,3'-(methylethylenedioxy)bis(N,N-dimethylisopropylamine) of Example I, supra, as a catalyst. The formulation used is shown below:

| | |
|---|---|
| Methyglucoside based polyol (hydroxyl number = 460) | 39.3% |
| Silicone | 0.5% |
| Dimethylaminethanol | 0.3% |
| Trichlorofluromethane | 14.0% |
| 3,3'-(methylethylenedioxy)bis(N,N-dimethylisopropylamine) | 0.5% |
| Polymeric isocyanates | 45.4% |

The cream time was 65 seconds, the rise time was 325 seconds, and the tack-free time was 310 seconds.

EXAMPLE V

An excellent urethane foam was prepared using the formulation given in Example IV except that the tertiary amine of Example II, supra, was used. The cream time was 77 seconds, the rise time was 360 seconds, and the tack-free time was 320 seconds.

Aldehydes containing 1 to 4 carbon atoms are the preferred alkylating agents for preparing the compounds of this invention. Examples of useful aldehydes are formaldehyde, paraformaldehyde, acetaldehyde, propionaldehyde and butyraldehyde. The polyoxyalkylenepolyamines which can be alkylated to tertiary amines of this invention are preferably polyoxyalkylenepolyamines having molecular weights within the range of 190 to 2,000. The polyoxyalkylenepolyamines of Ernest L. Yeakey's co-pending U.S. patent application Ser. No. 67,970 filed Aug. 28, 1970, now U.S. Pat. No. 3,654,370, derived from propylene oxide, butene-1 oxide, dodecene-1 oxide and octadecane oxide are useful in preparing the tertiary amines of this invention. Examples of the polyoxypropylenepolyamines from U.S. Pat. No. 3,654,370 useful in preparing the tertiary amines of this invention are polyoxypropylenediamines of the formula

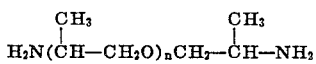

where $n$ is 2.4–2.6, 5.58, 15.91 and 33.13; tripropyleneglycoldiamine of the formula

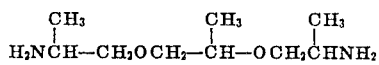

and tetrapropyleneglycoldiamine of the formula

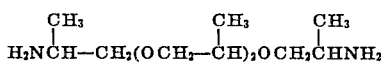

Known metallic hydrogenation catalysts such as nickel, cobalt, and platinum are useful in the preparation of tertiary amines of this invention. Reaction temperatures for preparing the tertiary amines of the invention are within the range of 50°–200°C., preferably 100°–125°C. Pressure ranges for preparing the tertiary amines of this invention are from about 100–5,000 psig., preferably 1,000–3,000 psig.

According to the disclosure of said U.S. Pat. No. 3,654,370, polyoxyalkylene polyamines having the formula:

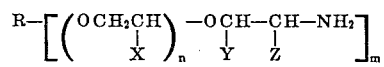

are prepared by treating the corresponding polyoxyalkylene polyols with ammonia and hydrogen over a catalyst prepared by the reduction of a mixture of the oxides of nickel, copper and chromium. These polyamines are useful as curing agents for epoxy resins, as plasticizers, as cross-linking agents or binders for textiles and as intermediates in the preparation of polyureas. The polyoxyalkylene polyols may be obtained by the addition of one or more alkylene oxides to an aliphatic polyhydric alcohol.

U.S. Pat. No. 3,654,370 is concerned with the preparation of polyoxyalkylene polyamines by the reductive amination of polyoxyalkylene polyols over a nickel, copper, chromium catalyst.

In U.S. Pat. No. 3,236,895 there are described polyoxyalkylenediamines derived from polyoxyalkylene glycols. These diamines were prepared by reaction of ammonia with certain esters of the corresponding polyoxyalkylene glycols or by treatment of the corresponding polyoxyalkylene glycols with ammonia and hydrogen in the presence of a Raney nickel catalyst. Both procedures of U.S. Pat. No. 3,236,895 suffer from a disadvantage of low yields. This is a particularly serious disadvantage when higher molecular weight polyoxyalkylene glycols are employed, since there is no practical way to remove unreacted glycol from the desired diamine.

A method is disclosed in U.S. Pat. No. 3,654,370 whereby polyoxyalkylenediamines and higher polyamines are obtained in good yield from the corresponding polyoxyalkylene polyols. In accordance with the procedure, a polyoxyalkylene polyol having the formula:

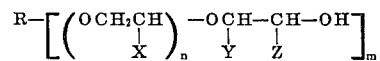

wherein R is the nucleus of an oxyalkylation-susceptible aliphatic polyhydric alcohol containing 2–12 carbon atoms and 2–8 hydroxyl groups, Z is an alkyl group containing 1–18 carbon atoms, X and Y are hydrogen or Z, $n$ has an average value of 0–50 and $m$ is an integer of 2–8 corresponding to the number of hydroxyl groups originally present in the polyhydric alcohol, is treated with ammonia and hydrogen at a temperature of 150°–275°C. and a pressure of 500–5,000 psig. over a catalyst prepared by the reduction of a mixture of the oxides of nickel, copper and chromium, the proportion of metals to each other, calculated on an oxide-free basis, being 60–85 mol percent nickel, 14–37 mol percent copper and 1–5 mol percent chromium. Preferred polyols useful in the process are obtained by the addition of ethylene oxide, propylene oxide or mixtures thereof to ethylene glycol, propylene glycol, glycerine or trimethylolpropane provided the terminating oxide of the polyol is propylene oxide.

The amines obtained by the process of U.S. Pat. No. 3,654,370 are primarily useful as curing agents for epoxy resins. They may also find application as plasticizers, as cross-linking agents and binders for textiles and as intermediates in the preparation of polyureas. By proper choice of the particular alkylene oxide and the amount of oxide, the solubility characteristics of the amines may be varied over a wide range to fit the needs of a particular application.

The catalyst for use in the process is one containing nickel, copper and chromium. Such a catalyst is described, for example, in U.S. Pat. No. 3,152,998. The catalyst is prepared by the reduction of a mixture of the oxides of nickel, copper and chromium in the presence of hydrogen at a temperature within the range of about 250° to 400°C. Calculated on an oxide-free basis, the catalyst contains 60–85 mol percent nickel, 14–37 mol percent copper and 1–5 mol percent chromium. A particularly preferred catalyst composition is one containing 70–80 percent nickel, 20–25 mol percent copper and 1–5 mol percent chromium.

The process of U.S. Pat. No. 3,654,370 is conducted at a temperature within the range of from about 150° to 275°C. with a preferred range being from 200° to 250°C. The pressure may be varied from 500–5,000 psig. with the preferred range being 2,000–4,000 psig. The process may be conducted with or without a solvent. Solvents that may be employed include water and inert hydrocarbons such as heptane and cyclohexane. A preferred solvent is liquid ammonia which can be present in a 10–40 mol excess with a 20–30 mol excess being preferred. It is convenient to use ammonia as a solvent since ammonia is necessary to the reaction.

The process may be conducted batchwise, as is done with prior art processes using Raney nickel catalyst, or it may be conducted continuously. Continuous operation is preferred, since, in general, batch processes are slow and require filtration to remove the catalyst.

The polyoxyalkylene polyol starting material of the process may be depicted by the formula:

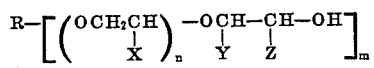

wherein R is the nucleus of an oxyalkylation-susceptible polyhydric alcohol containing 2–12 carbon atoms and 2–8 hydroxyl groups, Z is an alkyl group containing 1–18 carbon atoms, X and Y are hydrogen or Z, $n$ has an average value of 0–50 and $m$ is an integer of 2–8 corresponding to the number of hydroxyl groups in the polyhydric alcohol. It can be seen that in the above formula if R is a 1,2-propylene radical, Y is hydrogen, X and Z are methyl, $n$ is one or more and $m$ is two, the products are those of U.S. Pat. No. 3,236,895. However, if $n$ is zero, the product is the diamine prepared from tripropylene glycol and is thus a lower molecular weight diamine than those that can be obtained by the processes of U.S. Pat. No. 3,236,895.

If the polyoxyalkylene polyol contains three or more hydroxyl groups, novel polyamines result. These may be complex mixtures as described hereinbelow. First, it is to be understood that each polyoxyalkylene chain in the molecule does not necessarily contain the same number of oxyalkylene groups as every other polyoxyalkylene chain in the molecule. Thus, in the above formula, the value of $n$ is merely an average value. Further, reaction of certain of the polyols with ammonia results in the formation of nitrogen-containing heterocyclic compounds.

For example, the three-mol propylene oxide adduct of glycerine will contain a number of compounds, including the following:

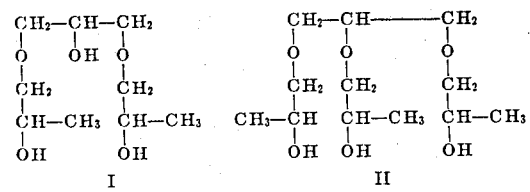

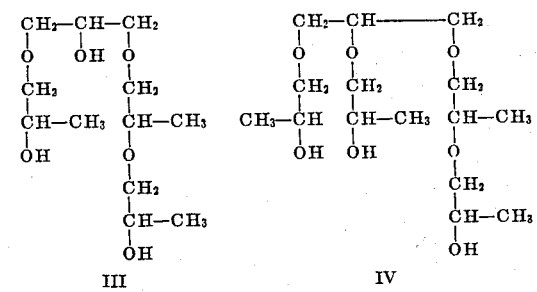

Reaction of compounds II and IV with ammonia will result in the formation of the corresponding triamine from each. However, reaction of compounds I and III with ammonia will lead to substituted morpholines as illustrated by the following compound which will result from I.

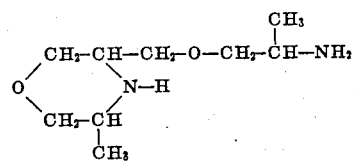

Thus, it can be seen that the treatment of the three-mol propylene oxide adduct of glycerine by our process results in a complex mixture of polyamines.

The polyoxyalkylene polyol starting materials for the process of U.S. Pat. No. 3,654,370 are well known in the art. Such polyols are obtained by the addition of alkylene oxides to polyhydric aliphatic alcohols containing 2–12 carbon atoms and 2–8 hydroxyl groups. Examples of such polyhydric alcohols include ethylene glycol, propylene glycol, glycerine, trimethylolpropane, trimethylolethane, hexanetriol, triethanolamine, pentaerythritol, methyl glucoside, xylitol, inositol, sorbitol, mannitol and sucrose.

To the aliphatic polyhydric alcohol is added one or more alkylene oxides employing known oxyalkylation procedures as taught, for example, in U.S. Pat. No. 3,000,963 (1961) to George P. Speranza. The polyoxyalkylene starting materials are prepared by reacting propylene oxide with a suitable initiator under oxyalkylation conditions. The initiator or charge material in such a reaction either for polymer or adduct formation is, in general, a hydroxyl-containing aliphatic organic compound composed entirely of the atoms, carbon, hydrogen and oxygen and selected from monohydric alcohols, glycols, polyglycols and triols. The adducts may be prepared by reacting ethylene oxide, propylene oxide or mixtures thereof with a hydroxyl-containing compound, for example, ethylene glycol, propylene glycol, glycerine or trimethylolpropane, provided the terminating oxide is propylene oxide. In general, polyol formation with propylene oxide is effected by contacting the initiator with propylene oxide at an elevated temperature in the range of 80°–150°C. under a moderately elevated pressure, and in the presence of an alkaline-reacting material or catalyst. Alkaline bodies suitable for effecting this reaction include sodium and potassium hydroxide and the corresponding hydrides and alkoxides. On completion of the oxyalkylation reaction, the crude reaction product containing the alkaline-reacting material is normally treated with an inorganic acid or acid-forming material to neutralize the alkaline bodies remaining in the reaction product after which it is filtered to produce a finished product. If oxyalkylene chains containing more than one oxyalkylene group are desired, the alkylene oxide used is preferably a terminal alkylene oxide having the formula:

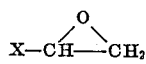

wherein X is hydrogen or an alkyl group containing 1–18 carbon atoms. Examples of such oxides include ethylene oxide, propylene oxide, butene-1 oxide, dodecene-1 oxide and octadecene-1 oxide.

The terminal hydroxyl groups of the polyoxyalkylene polyol should preferably be secondary hydroxyl groups in order to get the best yield of primary amine. For this reason, the polyoxyalkylene chains should be terminated with at least one mol of propylene oxide.

Preferred polyoxyalkylene polyols for use in this process are tripropylene glycol and propylene oxide adducts of glycerine, especially those containing an average of 1–10 oxypropylene groups for each hydroxyl group.

The process of U.S. Pat. No. 3,654,370 will be further illustrated by the following examples.

EXAMPLE VI

The reaction was carried out in a continuous reactor which as a stainless steel tube of 1¼ inch inside diameter and 27 inches in length. The reactor contained 487 ml. of a prereduced, pelleted nickel-copper-chromium catalyst containing 75 mol percent nickel, 23 mol percent copper and 2 mol percent chromium. Into the reactor were metered 160 l. per hour (measured at 0°C. and 1 atmosphere) of hydrogen, 0.32 pound per hour of ammonia and 0.74 pound per hour of a 50 percent solution of a polypropylene glycol of an average molecular weight of about 400 average molecular weight in water. The reactor was operated at 250°C., 3,000 psig. pressure and a space velocity of 1.0 g. of total liquid feed per ml. of catalyst per hour. The reactor effluent was stripped of ammonia and water at 150°C. and 50 mm. pressure. The product was a colorless liquid having 83.4 percent amino groups and 16.6 percent unreacted hydroxyl groups based on the original concentration of hydroxyl groups.

EXAMPLE VII

The procedure employed was essentially the same as in Example VI using 160 l. per hour of hydrogen, 0.39 pound per hour of ammonia and 0.67 pound per hour of a 50 percent solution of polypropylene glycol of an average molecular weight of about 400 molecular weight in cyclohexane. The reactor was operated at 240°C. and 3000 psig. The reactor effluent was stripped of ammonia and cyclohexane by heating to 150°C. under 5 mm. pressure. The product was a colorless liquid having 93.2 percent amino groups, 4.2 percent hydroxyl groups and 2.6 percent of the hydroxyl groups lost through hydrogenolysis. The amino groups were approximately 95 percent primary and 5 percent secondary and tertiary.

EXAMPLE VIII

In this example the feed to the reactor of Example VI consisted of 160 l. per hour of hydrogen, 0.22 pound per hour of ammonia and 0.84 pound per hour of a 50 percent solution of polypropylene glycol of an average molecular weight of about 1,000 molecular weight in cyclohexane. The reactor was operated at 250°C. and 3000 psig. The reactor effluent was stripped of ammonia and cyclohexane by heating to 150°C. under 5 mm. pressure. The colorless product remaining was a liquid having 87.0 percent of the original hydroxyl groups converted into amino groups, 11.6 percent unchanged hydroxyl groups and 1.4 percent hydroxyl groups lost through hydrogenolysis.

EXAMPLE IX

The feed to the reactor was 159 l. per hour of hydrogen, 0.68 pound per hour of ammonia and 0.38 pound per hour of tripropylene glycol. The reactor was operated at 225°C. and 3000 psig. The crude effluent from a run in which 323 g. of tripropylene glycol was passed through the reactor was distilled to yield 163 g. of 1,8-diamino-1,5,8-trimethyl-3,6-dioxaoctane, boiling point 150°–155°C. at 50 mm. pressure. The yield was 51 percent of theory.

EXAMPLE X

To the reactor operated at 225°C. and 3000 psig. were fed 159 l. per hour of hydrogen, 1.16 pounds per hour of ammonia and 0.45 pound per hour of tripropylene glycol. During this run 5.15 kg. of tripropylene glycol was passed through the reactor. Upon distillation of the crude reactor effluent, 2825 g. of the diamine of Example IX was obtained (55.5 percent yield). In addition there were obtained 917 g. of a mixture of unreacted tripropylene glycol and the monoamine from partial amination of tripropylene glycol and 699 g. of a residue fraction. The yield of diamine based on completely converted tripropylene glycol was 67 percent. The diamine was 99 percent pure by a chromatographic analysis.

EXAMPLE XI

To the reactor described in Example VI were metered 159 l. per hour of hydrogen, 0.77 pound per hour of ammonia and 0.29 pound per hour of tripropylene glycol at 215°C. and 3,000 psig. During the run a total of 8.98 kg. of tripropylene glycol was passed through the reactor. Distillation of the reactor effluent gave 1078 g. of a crude material, b.p. 159°–170°C. (50 mm.) after removal of the diamine. Redistillation of the crude fraction gave 458 g. of the monoamine, b.p. 138°–139°C. (15 mm.), from partial amination of tripropylene glycol.

EXAMPLE XII

Example XI was repeated using 790 g. of tripropylene glycol. After removal of the diamine, the monoamine and unreacted glycol there was obtained 41 g. of a triamine having the structure

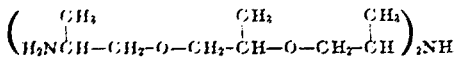

The triamine had a boiling range of 169°–175°C. at 1.5 mm. The structure was confirmed by infrared and nuclear magnetic resonance.

EXAMPLE XIII

The continuous reactor employed in this example consisted of stainless steel pipe one inch in diameter and 103 inches long. The reactor contained 1000 ml. of the catalyst described in Example VI. To this reactor were fed 6 ft.$^3$ per hour of hydrogen, 2.8 pounds per hour of ammonia and 3.03 pounds per hour of a polypropylene glycol of an average molecular weight of about 1000 molecular weight. The reactor was maintained at 235°–236°C. and 3000 psig. The reactor effluent was freed of ammonia and water by vacuum stripping. The colorless, viscous oil remaining had the following analysis:

| | |
|---|---|
| Total acetylatables | 2.08 meq./g. |
| Total amines | 2.00 meq./g. |
| Primary amines | 1.93 meq./g. |

EXAMPLE XIV

To the reactor of Example XIII were fed 6 ft.$^3$ per hour of hydrogen, 4.85 pounds per hour of ammonia and 2.32 pounds per hour of a propylene oxide adduct of glycerine having an average molecular weight of about 260. The reactor was maintained at 215°C. and 3000 psig. The reactor effluent was stripped to 160°C. at 40 mm. to remove water and ammonia. The colorless, viscous oil remaining had the following analysis:

| | |
|---|---|
| Total acetylatables | 8.95 meq./g. |
| Total amines | 8.64 meq./g. |
| Primary amines | 6.98 meq./g. |
| Tertiary amines | 0.15 meq./g. |
| Secondary amines | 1.51 meq./g. |

Fractional distillation of the mixture separated four major components which were purified by redistillation. These four novel compounds, their boiling points and the yield of each are shown below.

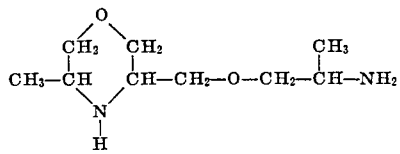

3-(2-Amino-2-methylethoxy)methyl-5-methylmorpholine, b.p. 121, 130° C. at 5 mm., 18% yield.

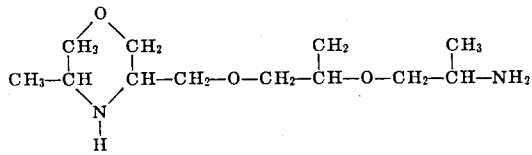

3-[2-(2-Amino-2-methylethoxy)-2-methylethoxy]-methyl-5-methylmorpholine, b.p. 125-131° C. at 1 mm., 16.1% yield.

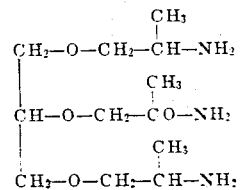

1,2,3-Tris(2-amino-2-methylethoxy)propane, b.p. 132-140° C. at 0.3 mm., 21.5% yield.

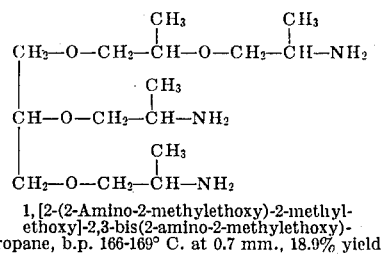

1,[2-(2-Amino-2-methylethoxy)-2-methylethoxy]-2,3-bis(2-amino-2-methylethoxy)propane, b.p. 166-169° C. at 0.7 mm., 18.9% yield.

EXAMPLE XV

To the reactor of Example XIII were fed 6 ft.$^3$ per hour of hydrogen, 3.25 pounds per hour of ammonia and 3.30 pounds per hour of propylene oxide adduct of glycerine having an average molecular weight of about 1500, while the reactor was maintained at 244°–246°C. and 3000 psig. After vacuum stripping to remove water and ammonia, the colorless product had the following analysis:

| | |
|---|---|
| Total acetylatables | 2.16 meq./g. |
| Total amines | 2.06 meq./g. |
| Primary amines | 1.95 meq./g. |

EXAMPLE XVI

To the reactor of Example XIII maintained at 220°C. and 2,500 psig. were fed 6 ft.$^3$ per hour of hydrogen, 1.7 pounds per hour of ammonia and 1.24 pounds per hour of a mixed ethylene oxide-propylene oxide polymer having an average molecular weight of 912. The mixed polymer was obtained by the addition of propylene oxide to a polyethylene glycol having an average molecular weight of about 700. The reactor effluent was freed of water and ammonia at 150°C. and 25 mm. leaving a pale yellow liquid which partially solidified upon standing at room temperature. The product had the following analysis:

| | |
|---|---|
| Total acetylatables | 2.15 meq./g. |
| Total amines | 2.02 meq./g. |
| Primary amines | 1.78 meq./g. |

Particularly desirable amines of U.S. Pat. No. 3,654,370 are the diamine obtained from tripropylene glycol and the polyamines obtained from propylene oxide adducts of glycerine, especially those containing an average of 1–10 oxypropylene groups attached to each hydroxyl group of glycerine.

I claim:

1. A compound of the formula

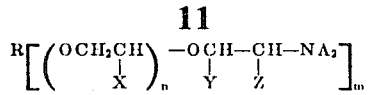

where Z is an alkyl group containing 1 to 18 carbon atoms, X and Y are hydrogen or Z, n has an average value of 0 to 50, m is an integer from 2 to 12, R is the nucleus of an oxyalkylation-susceptible aliphatic polyhydric alcohol containing two to 12 carbon atoms with functionality from 2 to 12 and A is an alkyl group containing one to four carbon atoms.

2. A compound according to claim 1 having the formula

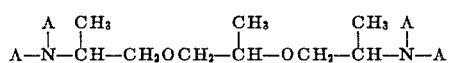

3. 3,3'-(Methylethylenedioxy)bis(N,N-dimethylisopropylamine).

4. A compound according to claim 1 having the formula

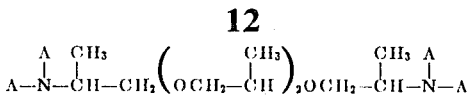

5. A compound according to claim 4 wherein A is methyl.

6. A compound according to claim 1 having the formula

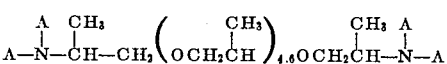

7. A compound according to claim 6 wherein A is methyl.

8. A compound having the formula

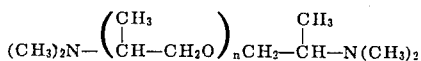

wherein n is 2.4–2.6, 5.58, 15.91 or 33.13.

* * * * *